(12) United States Patent
Erb

(10) Patent No.: US 8,676,169 B2
(45) Date of Patent: Mar. 18, 2014

(54) DIAL BY SPECIALTY SERVICES AND MANAGEMENT THEREOF

(75) Inventor: Paul Andrew Erb, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 481 days.

(21) Appl. No.: 12/800,408

(22) Filed: May 14, 2010

(65) Prior Publication Data

US 2011/0281563 A1 Nov. 17, 2011

(51) Int. Cl.
*H04M 3/42* (2006.01)

(52) U.S. Cl.
USPC ............... 455/414.1; 455/414.2; 455/414.3; 455/456.6; 455/457; 455/466; 455/456.2; 379/218.01

(58) Field of Classification Search
USPC ............ 379/218.01; 455/414.2, 414.3, 466, 455/457, 456.1, 456.2, 456.6
See application file for complete search history.

(56) References Cited

U.S. PATENT DOCUMENTS

| | | | |
|---|---|---|---|
| 5,561,704 A | 10/1996 | Salimando | |
| 5,943,611 A | 8/1999 | Molne | |
| 6,157,841 A | 12/2000 | Bolduc et al. | |
| 6,819,919 B1 | 11/2004 | Tanaka | |
| 7,376,433 B1 | 5/2008 | Hose | |
| 7,477,909 B2 | 1/2009 | Roth | |
| 7,603,360 B2 | 10/2009 | Ramer et al. | |
| 2002/0083087 A1* | 6/2002 | Deuser et al. | 707/500 |
| 2004/0252820 A1* | 12/2004 | Faber et al. | 379/201.12 |
| 2006/0146784 A1* | 7/2006 | Karpov et al. | 370/351 |
| 2007/0033256 A1* | 2/2007 | Ben-Itzhak | 709/206 |
| 2008/0019496 A1* | 1/2008 | Taschereau | 379/218.01 |
| 2008/0194272 A1* | 8/2008 | Smith et al. | 455/456.3 |
| 2008/0247531 A1 | 10/2008 | Borislow et al. | |
| 2009/0034709 A1* | 2/2009 | McGary et al. | 379/218.01 |
| 2009/0074176 A1* | 3/2009 | Mori et al. | 379/310 |
| 2009/0186596 A1 | 7/2009 | Kaltsukis | |
| 2010/0330965 A1* | 12/2010 | Zabawskyj et al. | 455/412.1 |

FOREIGN PATENT DOCUMENTS

| | | |
|---|---|---|
| EP | 1185062 A2 | 3/2002 |
| EP | 1744527 A1 | 1/2007 |
| JP | 2003-110686 | 4/2009 |
| WO | WO 2009/017659 A2 | 2/2009 |
| WO | WO 2009/094482 | 7/2009 |

* cited by examiner

Primary Examiner — Khalid Shaheed

(57) ABSTRACT

A phone system for providing dial by specialty features that can dynamically update providers within the system. A dial by specialty service can be provided on a user's mobile device. The dial by specialty service can prompt the user to enter in specialty information, which can represent specific services or goods the user is looking for. The dial by specialty service can then search an augmented directory to find the telephone number of a provider who best satisfies the search criteria. In one embodiment, the service can place a call on behalf of the user to transfer the user to the telephone number. The providers at the time of being called can decline to accept the call from the dial by specialty service. The selected provider can also choose to be removed from the augmented directory altogether.

17 Claims, 6 Drawing Sheets

DIAL BY SPECIALTY SERVICES AND MANAGEMENT THEREOF

TECHNICAL FIELD

This application generally relates to proximity searches, and more particularly, to dynamically managing directory services on a phone system having dial by specialty features.

BACKGROUND

"9-1-1; what is your emergency?" When immediate assistance for life threatening injuries is required, it is customary to dial a centralized number. By dialing, the caller can be connected to an appropriate department or government agency including police and fire. These departments can then dispatch the appropriate emergency staff for the caller.

Nevertheless, and in some instances, urgent assistance can be required, but no particular number is provided that would allow the caller to receive the assistance they are looking for, for example, a certified CPR person. It can also be necessary to obtain urgent assistance from someone with a particular specialty or knowledge such as a scuba rescue team. Today, no mechanism exists for providing centralized services for dispatch for these kinds of services.

In addition, and is more often the case, urgent assistance is not required, but still no centralized service is provided. There are situations that simply involve a request for assistance from someone available nearby. Often times, where there is no centralized dispatch capability, it is necessary to consult the phone book or similar directory service to obtain the telephone number of someone who is based in the area.

With the explosive growth of the Internet, directory services became available over the World Wide Web. To find a provider, the user could simply type in their postal code and within seconds, locate the nearest provider. However, this method was limited to the person knowing their location. Furthermore, this relied heavily on the use of a computer that was immobile.

Another issue that arose from such systems was that providers who did not want to be known were still being repeatedly called. This often resulted in numerous complaints to such operators of the systems. A need therefore exists for a system, apparatus and method that provides dial by specialty with management functions while overcoming the above-described limitations.

BRIEF DESCRIPTION OF DRAWINGS

The novel features believed to be characteristic of the application are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The application itself, however, as well as a preferred mode of use, further objectives and advantages thereof, will be best understood by reference to the following detailed description of illustrative embodiments when read in conjunction with the accompanying drawings, wherein:

DESCRIPTION OF THE APPLICATION

Figure 1:
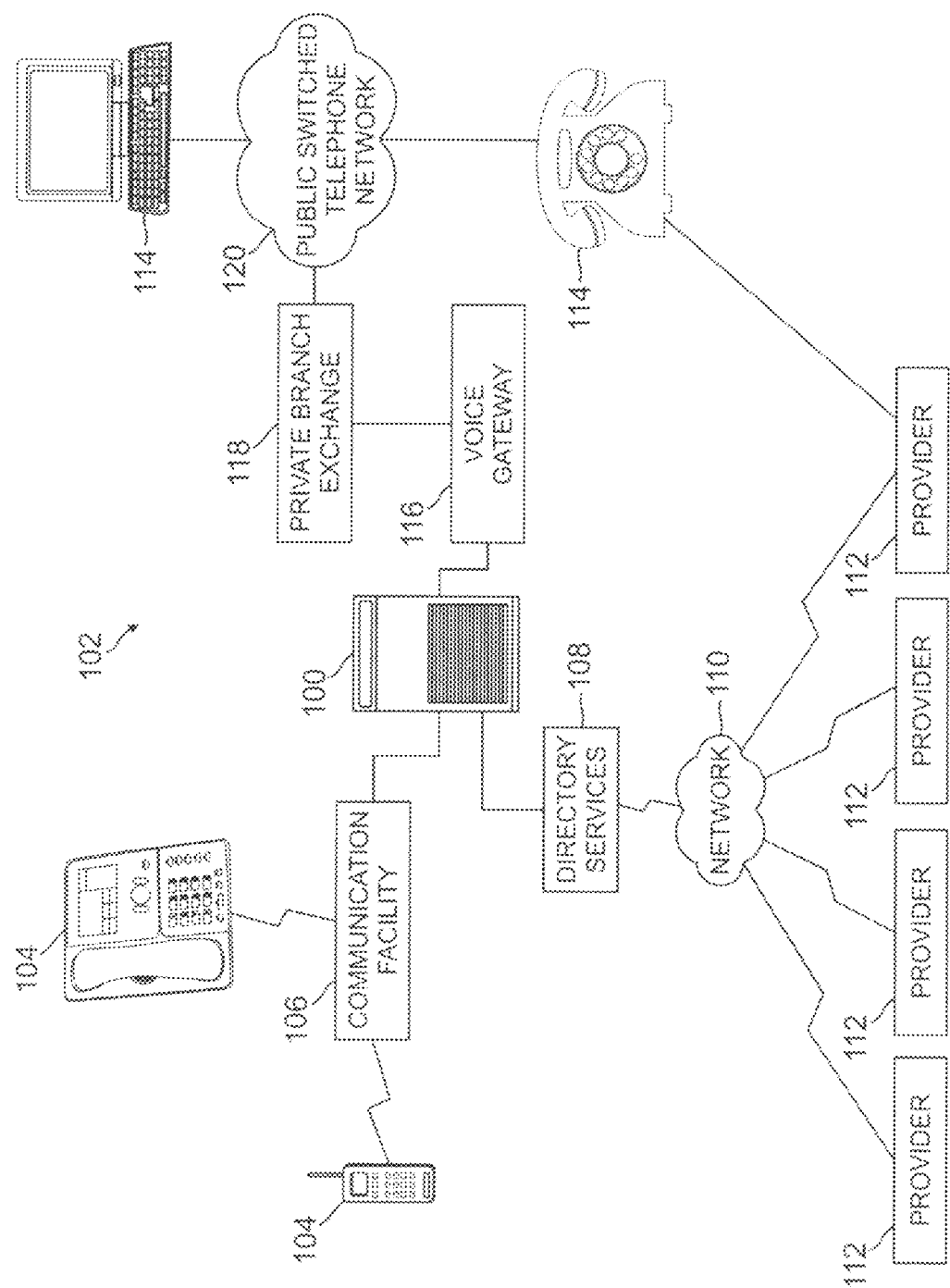
FIG. 1 depicts a typical operating environment for the dial by specialty system, apparatus and method in accordance with one aspect of the present application.

The description set forth below in connection with the appended drawings is intended as a description of presently-preferred embodiments of the application and is not intended to represent the only forms in which the present application can be constructed and/or utilized. The description sets forth the functions and the sequence of steps for constructing and operating the application in connection with the illustrated embodiments. It is to be understood, however, that the same or equivalent functions and sequences can be accomplished by different embodiments that are also intended to be encompassed within the spirit and scope of this application.

Overview

Generally described, the present application relates to a phone system, and more particularly, to dynamically managing directory services on a phone system that has dial by specialty functionalities. In an illustrative embodiment, a dial by specialty service can be provided to a user's mobile device. The dial by specialty service can prompt the user to enter in specialty information, which can represent specific services or goods the user is looking for. The information can also include urgency settings. The mobile phone can include a positioning system so that its coordinates can be provided to the dial by specialty service to locate nearby services or goods. The dial by specialty service can then search an augmented directory to find a telephone number of a provider who best satisfies the search criteria. In one embodiment, the telephone number associated with the search can be provided to the user. In another embodiment, the service can place a call on behalf of the user and transfer the user to that call.

The augmented directory, in accordance with the illustrative embodiment, can be dynamically managed by the providers. The providers at the time of being called can decline to accept the call from the dial by specialty service. The selected provider can also choose to be removed from the augmented directory altogether. As will become apparent from the discussion provided below, other options can be used to list and delist providers from the augmented directory.

Advantageously, the dial by specialty service can provide timely and local assistance by allowing a user to select options on their phone. In addition, by allowing providers to remove themselves from the augmented directory, unwanted harassment can be prevented. Other options, as will become apparent from the following discussion, can prevent the provider from receiving calls when no one is there. This can be particularly valuable when urgent services are requested.

The embodiments described above represent a small set of applications in which the system can operate in. One skilled in the relevant art will appreciate that the illustrative embodiment can include other features. Furthermore, each embodiment can, by itself, represent a feature to which this present application is directed to. More details regarding these and additional embodiments will be described below in further details.

Networked Environment

Depicted in FIG. 1, a typical networked environment 102 for the dial by specialty and management services are shown. The services can be provided within a phone system 100, which can also be referred to as a communication system or communication service provider. Numerous components will be described below. Known to those skilled in the relevant art fewer or more components can be used within the environment 102 and the components described herein represent one embodiment.

Components within the networked environment 102 can communicate with each other using logical connections. These logical connections can be achieved by a communication device coupled to or integral with the phone system 100. The phone system 100 can be a server, a router, a network personal computer, a client, a peer device, or other common network node, and typically includes many or all of the elements associated with a standard server.

In the illustration shown in FIG. 1, the phone system 100 can be provided in the form of a VoIP phone system 100. Traditionally, VoIP phone systems 100 use digitized audio. The digitized audio can be delivered in packet form and can be transmitted over intranets, extranets, and the Internet. VoIP phone systems 100 can cover computer-to-computer, computer-to-telephone, and telephone-based communications.

Operatively, VoIP phone systems 100 can employ session control protocols to control the set-up and tear-down of calls as well as audio codecs which encode speech allowing transmission over an IP network as digital audio via an audio stream. Codec use is varied between different implementations of VoIP. Some implementations rely on narrowband and compressed speech, while others support high fidelity stereo codecs. Numerous types of VoIP phone system 100 protocols exist, which are known to those skilled in the relevant art.

Services provided by the phone system 100 can be used by the mobile phone 104, or other similar devices. In one embodiment, an IP phone 104 or landline phone can be used. This application is not limited to any specific phone. In accordance with one embodiment, the phone 104 can include a graphical user interface (GUI) to facilitate the dial by specialty service. In other embodiments, the services can be distributed over a voice response system (VRS) known to those skilled in the art.

As provided within FIG. 1, the phones 104 can connect with the phone system 100 through a communication facility 106. The communication facility 106 can include a base station for wireless devices such as the mobile phone 104 described above. The communication facility 106 can also provide landline services for the IP phone 104.

Within the networked environment 102, directory services 108 can be provided to the phone system 100. While represented as a separate component, the directory services 108 can be part of the phone system 100. In one embodiment, the directory service 108 can be a website operating on a server. The website can be used to interact with the phone system 100 so that provider information can be updated. The directory services 108 can also be a VRS. In one embodiment, the VRS can be managed by administrators.

While not shown within FIG. 1, the directory services 108 can include an augmented data repository. The augmented data repository can be updated by providers 112 as shown above. The augmented data repository can include telephone numbers of the providers 112. In addition, location information for the providers 112 can be stored on the augmented data repository. Specialty information about the providers 112 can include presence data, schedule data, hours of operation, de-listed telephone numbers, all of which can be stored on the augmented data repository. The augmented data repository can be centralized, distributed or aggregated from other sources.

Continuing with FIG. 1, the directory services 108 can be coupled to a number of providers 112 through a network 110. The providers 112 can offer services or goods that the users of the phones 104 are looking for. In operation, the provider can list 112 their information directly or indirectly with the directory services 108. Once received, the information can be stored within the augmented data repository which can typically be accessed by the phone system 100. In one embodiment, the provider 112 can access the directory services 108 through the network 110 either by a website or VRS. Further implementations are known to those skilled in the relevant art.

As shown in FIG. 1, the telephone numbers associated with the providers 112 can be associated with communication devices 114. The communication devices 114 can include wired desktops, softphones, wireless devices, mobile phones, laptops, telephones, etc. In one embodiment, which will become apparent from the discussion below, the phone system 100 can link communications with the phones 104 and the communication devices 114. The communication devices 114 can be external to or associated with the phone system 100. When external to the system 100, the called devices can communicate to the phone system 100 through a voice gateway 116. The voice gateway 116 can include private branch exchange (PBX) functions for switching voice calls from the public switched telephone network 120 via a PBX 118 and from the phone system 100.

FIG. 1 represents components illustrative of a typical environment 102 for allowing dial by specialty features that can dynamically update providers 112. These components should not be construed as limiting the scope of the present application, but instead, the environment should be viewed as only one environment 102 in which the system 100 can operate in.

Mobile Device

Before describing specific operations within the networked environment 102, the hardware and software of a typical mobile phone 104 will be described to illustrate the dial by specialty service which can be implemented on the mobile phone 104. While a mobile device 104 will be described in detail, those skilled in the relevant art will appreciate that other types of phones 104 can be used. Those components presented herein are for purposes of illustration and should not be construed as limiting to the present application.

Figure 2:
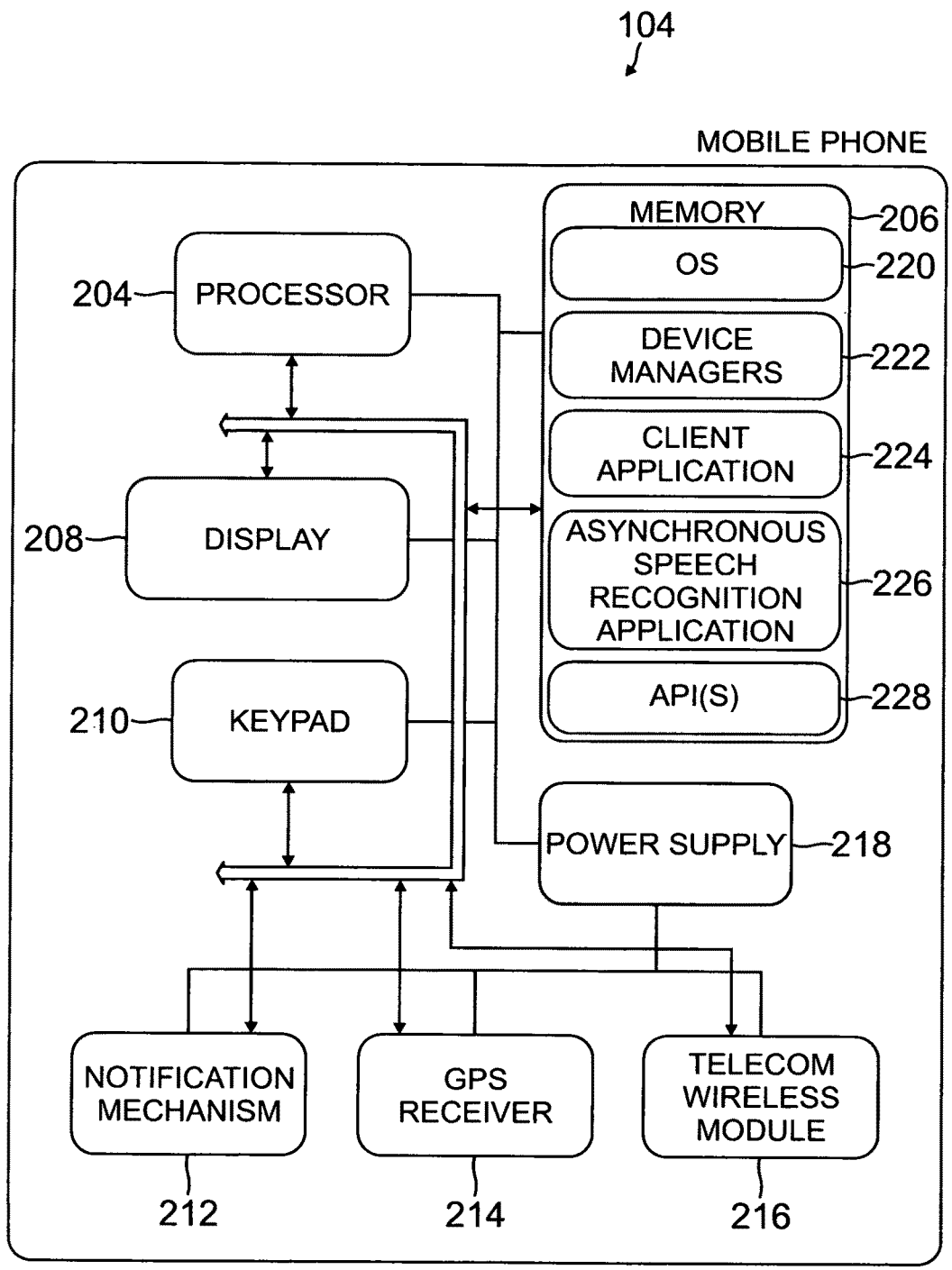
FIG. 2 shows exemplary hardware and software components of a typical mobile phone in accordance with one aspect of the present application.

As shown in FIG. 2, the mobile phone 104 can have a processor 204 for implementing logic, a memory 206, a display 208, and a keypad 210. The display 208 of the mobile phone 104 can be a liquid crystal display (LCD), or any other type of display commonly used in mobile phones 104. The display 208 can be touch-sensitive, and can act as an input device. The keypad 210 can be a push button numeric dialing pad (such as on a typical telephone), a multi-key keyboard (such as a conventional keyboard), or any other device for inputting textual data. In some mobile phones 104, the keypad 210 can be shown on the display 208 allowing the touch-sensitive display 208 to act as the keypad 210.

The memory 206 generally includes both volatile memory (e.g., RAM) and non-volatile memory (e.g., ROM, Flash Memory, or the like). The non-volatile portion of the memory 206 can be used to store persistent information which should not be lost when the mobile phone 104 is powered down. The mobile phone 104 can include an operating system (OS) 220, such as Windows® CE or Windows Mobile® available from Microsoft Corporation, Redmond, Wash., or other OS. The OS can reside in the memory 206 and be executed on the processor 204.

The memory 206 can also include one or more device managers 222 for interacting with one or more I/O devices. The device managers 222 can be software installed on the mobile phone 104. A device manager 222 can correspond to each I/O device. In addition to the device manager 222, one or more application programs can be loaded into memory 206 and run on or in association with the operating system 220. Examples of application programs that can be run on the mobile phone 104 include phone dialer programs, email programs, scheduling programs, personal information management (PIM) programs, word processing programs, spreadsheet programs, Internet browser programs, instant messaging programs, GPS and/or mapping programs, health monitoring programs, weather programs, and so forth. Of course, numerous other types of application programs usable on the mobile phone 104 will be apparent to those of ordinary skill in the relevant art.

These applications can use and store information in the memory 206, such as e-mail or other messages used by an e-mail application, contact information used by a PIM, appointment information used by a scheduling program, documents used by a word processing program, instant messaging information used by an instant messaging program, maps and waypoints used by the GPS and/or mapping programs, medical information used by the health monitoring program, and the like.

Also within the memory 206, a client application 224 can be run on the mobile phone 104, which allows the user to configure search criteria as well as update its location. The client application 224 can run the dial by specialty service. The client application 224 can be installed on the mobile phone 104 through a network connection or via a direct link. Alternatively, the client application 224 can be preinstalled and can be part of the operating system 220 described above.

An automatic speech recognition (ASR) application 226 can also be provided on the mobile phone 104. The ASR application 226 can be used for converting voice communications into computer readable information. The memory 206 can also include a collection of one or more APIs 228 for facilitating wireless communication between the mobile phone 104 and one or more remote I/O devices. The APIs 228 can be invoked by the applications to recognize and control the one or more remote I/O devices. In this manner, the mobile phone 104 is able to take advantage of services or functionalities of the one or more remote I/O devices.

The mobile phone 104 can also include a power supply 218, which can be implemented as one or more batteries, fuel cells, or other sources of electrical power. The power supply 218 might further include an external power source, such as an AC adapter or a powered docking cradle that supplements or recharges the batteries.

The mobile phone 104 can also include one or more audio, visual, and/or vibratory notification mechanisms 212. These notification mechanisms 212 can be directly coupled to the power supply 218 so that when activated, they remain on for a duration dictated by the notification mechanism 212 even though the processor 204 and other components might shut down to conserve energy. Examples of notification mechanisms 212 can include one or more LEDs, an audio interface, and a vibration generator. The one or more LEDs, when used, can be programmed to indicate the status of the device (e.g., on, off, charging, incoming call, message waiting, etc.). The audio interface, when used, can provide audible signals to, and receive audible signals from, the user. For example, the audio interface can be coupled to a speaker for providing audible output and to a microphone for receiving audible input, such as to facilitate a telephone conversation. The vibration generator, when used, can be programmed to vibrate to indicate a status of the device (e.g., vibrate when an incoming call or text message is received, when an alarm goes off, etc.).

The mobile phone 104 can also include at least one GPS receiver 214 that can facilitate determining location information of the mobile phone 104. The GPS receiver 214 can calculate its position using precise timing signals sent by GPS satellites. These signals can include information such as the time the message was transmitted, precise orbital information, and the general system health and rough orbits of all GPS satellites. The location information can then be integrated into the client application 224.

While location information can be obtained from the GPS receiver 214, those skilled in the relevant art will appreciate that the present application is not necessarily limited to a GPS implementation and that location information can be obtained through alternative devices. The mobile phone 104 can also include a telecommunications wireless module 216, such as a GPRS or WiFi module that facilitates wireless connectivity between the mobile phone 104 and the outside world via the communications network.

For purposes of illustration, a set of examples will now be provided to show details for the dial by specialty service and management thereof. These examples are given so that a general understanding of the present application can be understood by those skilled in the relevant art. The provided examples begin by showing specialty services to a mobile phone 104 from the perspective of the phone system 100. Thereafter, options allowing a user to remove themselves from the directory services 108 are provided.

Phone System

Figure 3:
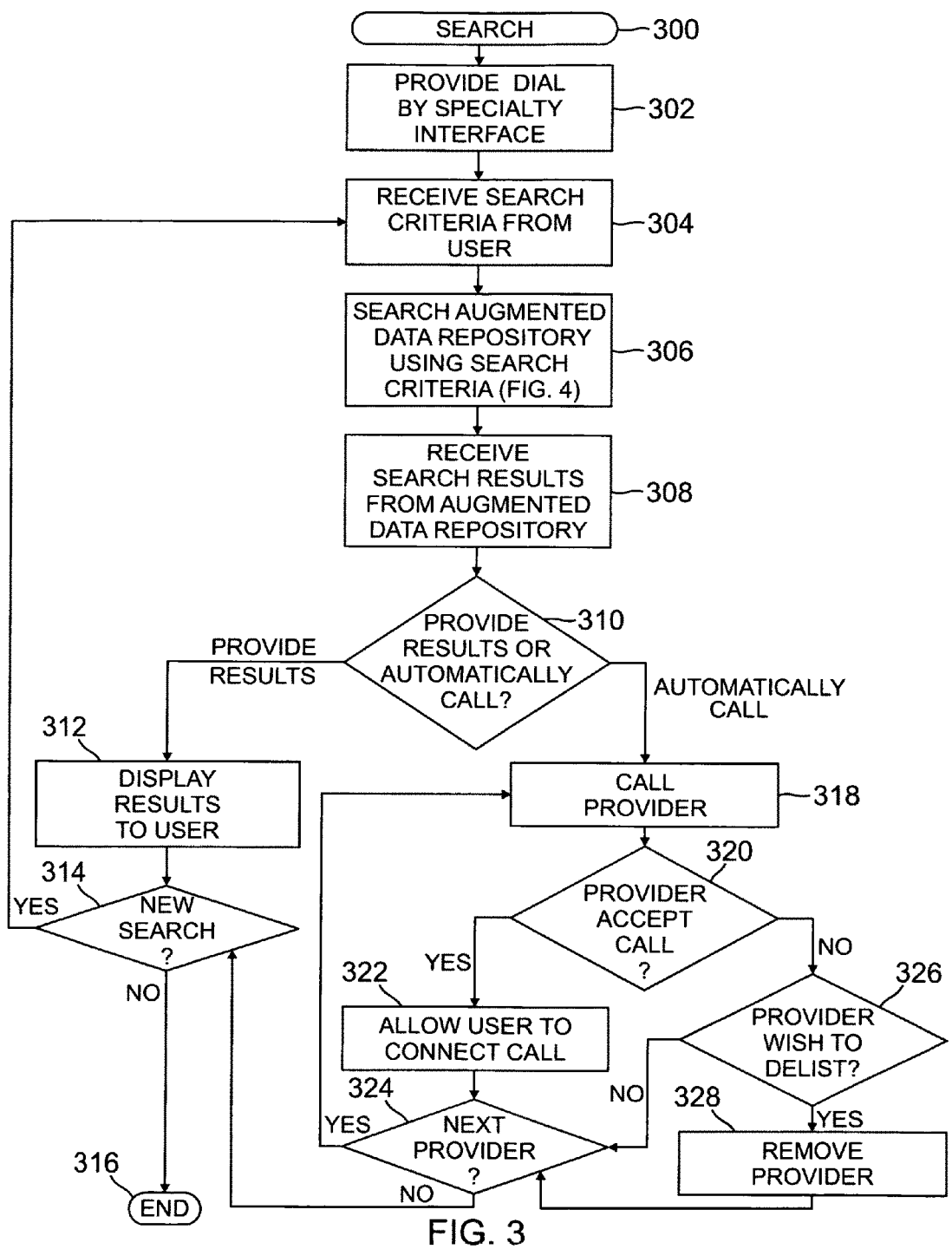
FIG. 3 is a flow chart representing illustrative processes for the phone system in accordance with one aspect of the present application.

FIG. 3 is a flow chart representing illustrative processes for the phone system 100 in accordance with one aspect of the present application. In particular, the flow chart shows dial by specialty and management services therein. While these processes are taken from the perspective of the phone system 100, those skilled in the relevant art will appreciate that similar processes can be provided by other components within the environment 102. The processes can begin at block 300.

At block 302, a dial by specialty interface can be provided to a phone 104. Known to those in the art, the user can access the system 100 through a number of ways. As provided above, a client application 224 on the phone 104 can be provided that has GUI capabilities. One such phone 104 can include the 5360 Mitel® IP phone. In another embodiment, the phone system 100 can also establish a connection with the phone 104 using an interactive voice response (IVR) capability. The user of the phone 104 can respond using an ASR application 226, as described above. Softkey functionalities, similar to the call by name feature on a Mitel® 5140 IP telephony, can also be implemented on the phone 104. In another embodiment, a proxy application can be used, for example, a java applet or internet client.

At block 304, the phone system 100 can receive search criteria from the user to determine products and services the user is looking for. The criteria can be received through the GUI or other methods known to those skilled in art. In one embodiment, the user can also choose to resume a previous dial by specialty search to find the next entry matching the given criterion.

Generally, the search criteria provided by the phone 104 can include location information of the caller. The caller can provide their current location so that providers 112 can be found that are near or at the caller's location. Location information can include pillar location, postal code, street address, GPS location, and degrees longitude/latitude, to name a few. In one embodiment, the caller can specify the distance the user is willing to travel for the goods or services offered by the provider 112. This proximity information can be measured in meters, kilometers, and degrees longitude/latitude.

In one embodiment, urgency information can also be provided by the user. Such urgency indications can be made so that services or goods can be timely provided. In one embodiment, the provider 112 can display the wait time for their service or goods. Pricing information, which can be another criterion, can also be a valuable consideration when looking for a provider 112. Options that can be included within the pricing information selection can be free, budget, value, regular, exclusive and/or luxury.

It is envisioned that some specialties for selecting criteria can include CPR, mechanic, translator, bylaw officer, MD, Rescue Diver, consumer advocate, etc. Other specialties can include hobbies, accreditation, awards, etc. Those skilled in the relevant art will appreciate that a number of specialties can be provided that can be broad and/or narrow. These specialties can also be grouped in categories and sub-categories.

Continuing with the example using the 5360 Mitel® IP phone 104 above, the user can select from a number of available specialties provided by the client application 224. On the GUI, the user can be presented with a number of options to specify search criteria. In one embodiment, the user can press a button on the phone 104 to launch the dial by specialty application. The user can then page through the available specialties to find services and goods, such as Food Delivery. After selecting Food Delivery through the GUI, in one embodiment, the user can be presented with the option to enter sub-specialties. This option can allow the user to specify other information such as delivery time (for urgency), their location (if different than from where they are calling), and price. Choosing a delivery time can allow the user to select the fastest provider 112. In one embodiment, the user can be able to enter the number of minutes or time the user is willing to wait for receiving the goods or services, for example, forty (40) minutes.

Figure 4:
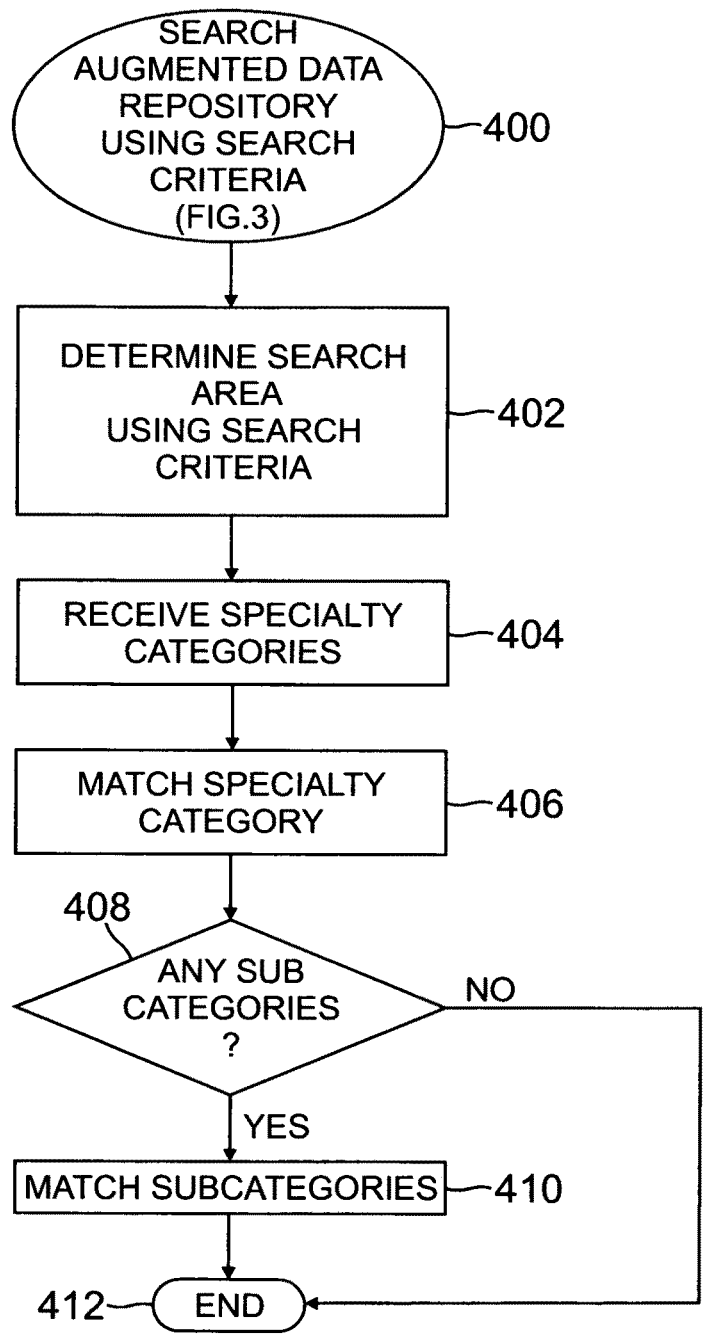
FIG. 4 provides a flow chart providing a sample subroutine for searching through an augmented data repository in accordance with one aspect of the present application.

Continuing with FIG. 3, once the search criteria has been specified, or left as defaults, the user can initiate a request for one or more matching entries based on the capabilities of the user interface accessing the service. At block 306, a search of the augmented data repository on the directory services 108 can be made using the search criteria. FIG. 4 provides a flow chart providing a sample subroutine for searching through an augmented data repository in accordance with one aspect of the present application. This is one example and should not be construed as limiting the scope of the present application. The processes for the subroutine can begin at block 400.

At block 402, the phone system 100 can determine the search area using search criteria provided by the user. The search area can be defined by the area near the position of the phone 104. Typically, this is calculated using the coordinates of the phone 104. To calculate the search area, the location information can be used in conjunction with the proximity distance specified by the user. At block 404, the phone system 100 can receive the specialty categories, which can include categories and subcategories.

At block 406, the system 100 can search the augmented directory number repository for one or more entries matching the given criterion within the determined search area. While the term match is used, those skilled in the relevant art will appreciate that an exact match is not required. Instead, the system 100 makes determinations based on associations with the given criteria and the providers 112 within the repository.

As shown above, the repository can include directory numbers with associated contact information as well as one or more specialties and additional information useful as search criteria, where available. Matches can be made using equivalence comparisons, fuzzy logic or other mechanism to improve the success rate of the search. At decision block 408, the phone system 100 can determine whether there are any subcategories specified by the user. When subcategories have been provided, then the subcategories can be matched with providers 112 within the repository. The processes can return to FIG. 3 by ending at block 412. The matches provided above, either using the categories and/or subcategories, can then be provided to the user for selection or automatic selection, which will described below.

At block 308, the results are received from the augmented data repository. Thereafter, a number of options can be provided to the user. The options provided below represent a number of embodiments, but do not disclose the entire scope of the present application. At decision block 310, the phone system 100 can determine whether to provide the results to the phone 104 or to automatically call the provider 112. This determination can be made by the user. In one embodiment, the determination can be made dependent on the capabilities of the phone 104. In another embodiment, the phone system 100 can make the determination. The determination can be dependent on whether the phone system 100 provides automatic call features.

When it is determined that the results should be provided, at block 312, the results are sent to the user where they can be displayed. The results can be displayed based upon ranking algorithms known to those skilled in the relevant art. In one embodiment, the results can show relevant categories that were found within the results. At decision block 314, the user is prompted to determine if they would like a new search. When the user requests a new search, the processes can return to block 304, where new search criteria can be received. Alternatively, when the user has finished, the processes can end at block 316.

Continuing with the 5360 Mitel® IP phone 104 example provided above, a number of Pizza Delivery entries can be returned that match the search criteria selected on the GUI interface. The results can be displayed by the client application 224. In one embodiment, the user can select from the matching entries and when provided by the phone 104, the user can make a call to the selected entry.

When it is determined that an automatic call should be placed at block 310, a call can be made to the provider 112 at block 318. In one embodiment, the phone system 100 can call a matched telephone number and provide an automated voice message when answered by the provider 112. The voice message can identify the dial by specialty service and the criteria that resulted in calling the telephone number. In one embodiment, the voice message can provide an option to allow the provider 112 to not accept the call and/or de-list the telephone number from the directory services 108. At decision block 320, the phone system 100 can determine whether the provider 112 accepted the call or not.

If the provider 112 accepts the call, at block 322, the phone system 100 can allow a user to connect the call to the provider. In one embodiment, not shown, the processes can end at block 316 when the call is connected thereby skipping decision blocks 324 and 314. As depicted within the environment 102 of FIG. 1, a call can be connected from a phone 102, which made the call, to a communication device 114, which can be associated with a provider 112. At decision block 324, the phone system 100 can determinate whether the user wishes to proceed with another provider 112 that was matched. In typical embodiments, a number of providers 112 are sent to the phone 104. When the user selects another provider, the phone system 100 can call the provider at block 318. In one embodiment, this can be performed automatically without user interaction. Accordingly, the phone system 100 can automatically dial each of the matched providers 100. When the user decides not to call the next provider 112, the phone system 100 can proceed to decision block 314.

Returning to decision block 320, when the provider 112 does not accept the call, the phone system 100 can allow the provider 112 the option to delist at decision block 326. In accordance with one embodiment of the present application, the provider 112 can delist as they no longer wish to be associated with the directory services 108. Those skilled in the relevant art will appreciate that there exists a number of reasons for delisting.

In one embodiment, the matching criteria can be shown to a provider 112. The phone system 100 can allow the provider 112 to change their information within the repository generally when the matching criteria are not related to the provider 112. The provider 112 can also manipulate other data stored within the repository to dynamically allow the provider 112 to be called when the best matches are available.

When the user wishes to delist, the phone system 100 can remove the provider at block 328. The phone system 100 can then determine whether to go to the next provider 112 at decision block 324. In one embodiment, when the user wishes to not delist or is otherwise not responsive to calls, the phone system 100 can executed the processes at decision block 324. While numerous features were shown for removing the provider 112, or manipulating the information associated with the provider 112, numerous other ways will be discussed below.

Member Search

In localized environments, a more refined dial by location service can be provided. In one illustrative embodiment, the service can be used to place a call to the closest staff member having a particular specialty for consultation on a case within a hospital setting. In another illustrative embodiment, an employee profile directory can be accessed to search for an employee by specified criteria including name, email and location. The service can have access to the employee profile directory, which can include location and specialty information, i.e. job description, for generally each telephone number associated with an employee. These illustrative embodiments provide one set of examples of the dial by location service. Nonetheless, they do not represent the entire scope of the present application.

Figure 5:
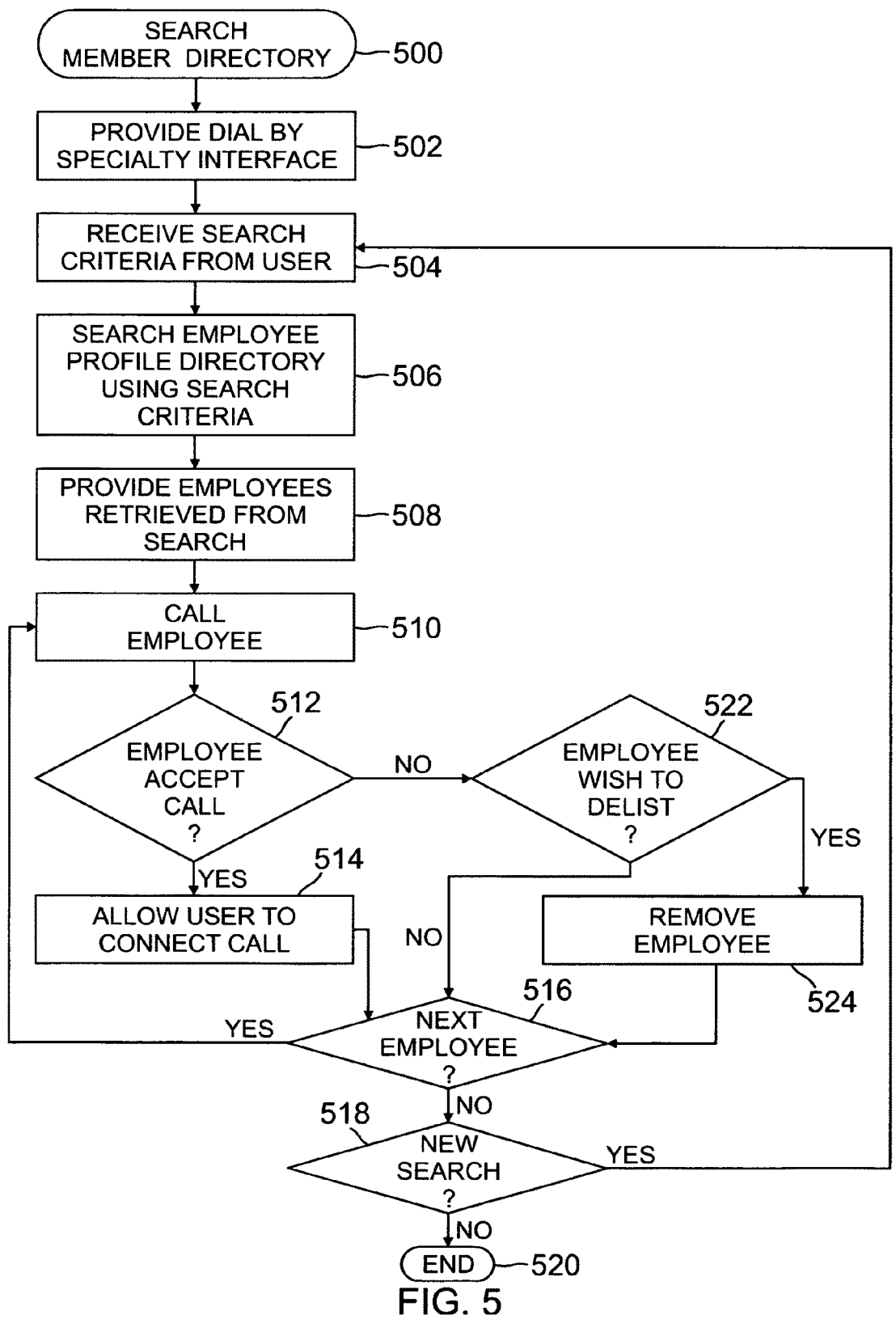
FIG. 5 is a flow chart showing exemplary processes for searching a member directory in accordance with one aspect of the present application.

FIG. 5 represents a flow chart showing exemplary processes for searching a member directory in accordance with one aspect of the present application. The processes can apply to the hospital and employee settings described above as well as other environments wherein the user requests for member services. The processes can begin at block 500. At block 502, the phone system 100 can provide a dial by specialty interface. In one embodiment, the interface can take the form of a GUI. Other interfaces, known to those skilled in the relevant art, can also be provided to the user.

At block 504, the phone system 100 can receive the search criteria from the user. The search criteria can include information related to an employee or service that they are looking for. In one embodiment, these settings can include areas in which the employee specializes in. For example, the user can provide a request for a Mitel® employee who knows Microsoft Excel® programming. At block 506, an employee profile directory can be searched using the provided criteria.

At block 508, the employees that matched with the criteria can be received from the employee profile directory. While the term match has been used, those skilled in the relevant art will appreciate that the criteria does not exactly have to match. Rather, the criteria can merely be associated with or correspond to the members provided within the employee profile directory.

At block 510, a call can be placed to a matched employee using the telephone number associated with the employee in the employee profile directory. At decision block 512, the matched employee can accept the call. At block 514, and when the call is accepted by the employee, the phone system 100 can allow a user to connect the call to the employee. In one embodiment, not shown, the processes can end at block 520 when the call is connected thereby skipping decision blocks 516 and 518. The phone system 100 can then proceed to decision block 516 where the user can determine whether they want to call the next employee. A call can be placed to the next employee at block 510 when the user selects this option.

When the user does not choose to call the next employee, at decision block 518, the user can determine whether they want a new search. When no additional search is requested, the processes can end at block 520. However, when the user requests for another search, search criteria can then be received at block 504.

Returning to decision block 512, when the employee does not accept the call, the employee can determine whether they wish to delist at decision block 522. In one embodiment, the employee can alter their search criteria so that future searches can be optimized. When the employee does not wish to delist, the user can determine whether they wish to select the next employee at decision block 516. In the alternative, the employee can be removed from the directory at block 524.

Directory Services

Figure 6:
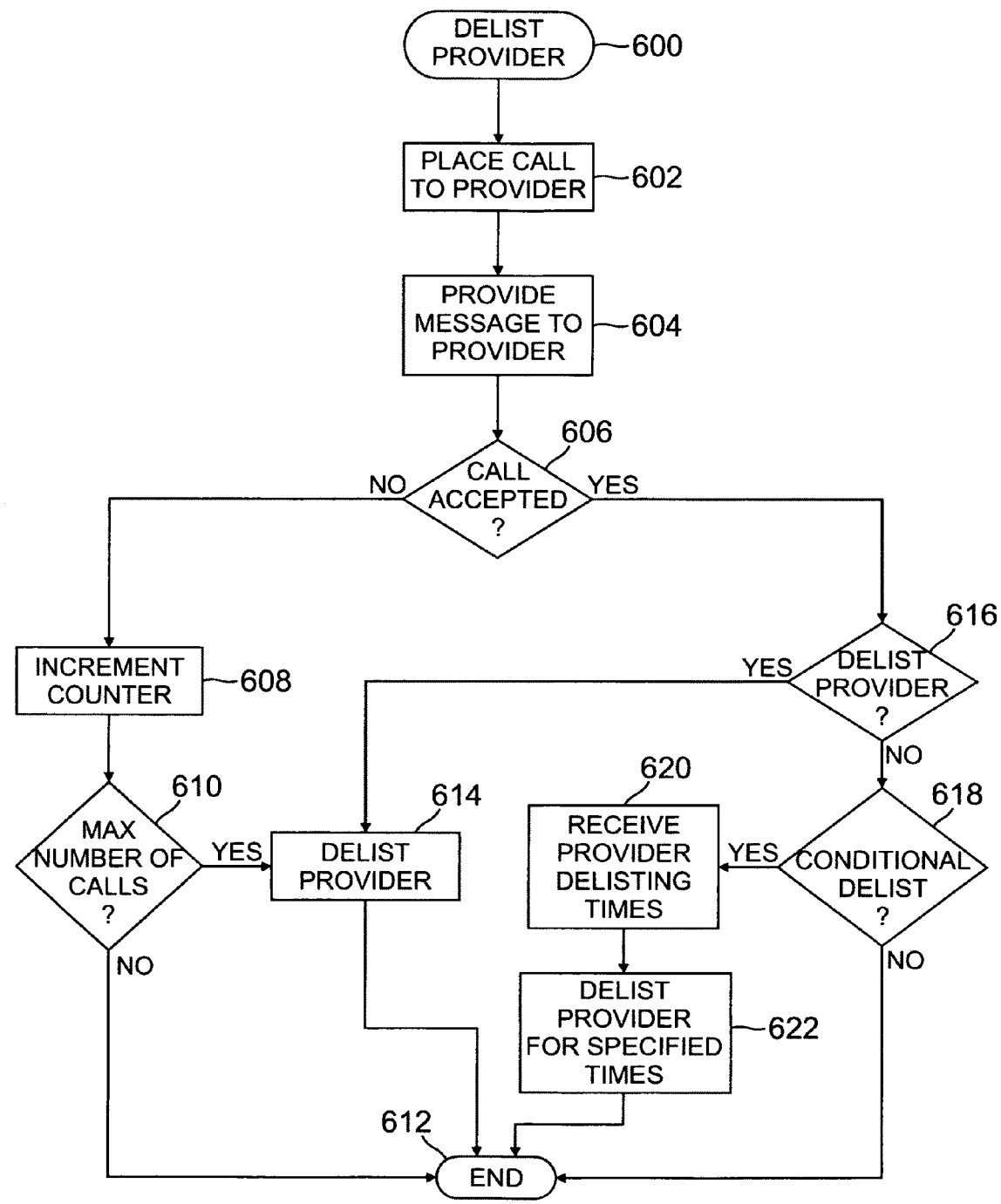
FIG. 6 represents a flow chart that provides exemplary processes for allowing a provider to delist themselves from the augmented data repository in accordance with one aspect of the present application.

Previously shown, the phone system 100 allows providers 112 to be listed and delisted from the directory services 106. FIG. 6 represents a flow chart that provides exemplary processes for allowing a provider 112 to opt out of the augmented data repository in accordance with one aspect of the present application. This opt out mechanism is applicable to directory search and/or look-up services as well as being more generally applicable to any service that provides access to a destination address. As shown, the processes, beginning at block 600, do not necessarily have to search through the augmented directory as provided above.

At block 602, the phone system 100 can call a provider 112. In one embodiment, the provider 112 can be selected randomly. In another embodiment, the provider 112 can determine which provider 112 to call based on the activity of a provider 112. For example, when a provider 112 rarely accepts calls, the provider 112 can be placed on a list to determine whether the provider 112 should be delisted. While the phone system 100 made the call in the previous embodiment, the provider 112 as well can call the phone system 100.

At block 604, the phone system 100 can provide a message to the provider 112. The message can be communicated through an automated voice system that presents itself to the provider 112. The automated message can include information on how the provider 112 was selected or search criteria used by the phone system 100 to locate the provider 112. In response, the provider 112 can provide input into the phone system 100 using an IVR or equivalent system.

At decision block 606, the phone system 100 can determine whether the call was accepted by the provider 112. In one embodiment, the phone system 100 can track the number of calls missed to determine whether to delist the provider 112. When the call is not accepted, a counter can be incremented at block 608. Often, when unresponsive to calls, the provider 112 no longer wishes to accept calls. In the alternative, the wrong phone number can have been inadvertently placed within the directory services 108.

At decision block 610, the phone system 100 can determine whether the maximum number of calls have been received by the provider 112. In accordance with the embodiment presented above, after the provider 112 fails to answer a specified number of calls it can be automatically delisted as shown at block 614. Thereafter the processes can end at block 612.

Returning to decision block 606, when the call is accepted, the provider 112 can still delist itself from directory services 108 at decision block 616. In typical embodiments, the provider 112 can either wholly or partially delist themselves. When the provider 112 decides to be completely removed, the phone system 100 delists the provider 112 at block 614. In the alternative, when the user decides not to be completely delisted, at decision block 618, the phone system 100 can determine whether the provider 112 wishes to conditionally delist themselves. Conditional delisting can allow the provider 112 to specify a period of time when calls should not be connected to them. For example, a business going through renovations can conditionally delist themselves during the construction period. In another example, a business can specify hours of operation in which calls would be received. An IVR or equivalent system can provide these options while active or this can be done using a web based or similar interface.

When the user decides to not delist at all, the processes can end at block 612. When the provider 112 decides to be conditionally delisted, the phone system 100 can receive provider delisting times at block 620. At block 622, the provider can be delisted for the provider 112 specified times. The processes can end at block 612

In typical embodiments, the phone system 100 initiates the conversation with the provider 112. In one embodiment, the provider 112 can start the conversation by placing a call to the opt out mechanisms associated with directory services 108. In this way, the provider 112 can be delisted from the service and the phone system 100 does not have to search for the provider 112. In one embodiment, the provider 112 can be listed or relisted on the directory services 108 through a web-based service or similar interface.

In the above usage, the opt out mechanism was associated with one or more directory search and/or look-up services 108. In another embodiment, the opt out mechanism can be introduced at the destination device. For example, upon answering an incoming call identified as being from a directory, telemarketing, charity, or fund-raising service, the opt out mechanism can inform the answering party of the directory service 108 placing the call and provide the choice to ignore the call or delist the service. In turn, subsequent calls from a delisted service can be blocked by the opt out mechanism.

Systems, Methods, and Operations

In accordance with one aspect of the present application, a phone system is provided. The phone system can include a data repository storing a list of providers. In addition, the phone system can include at least one processor and a memory operatively coupled to the processor, the memory storing program instructions that when executed by the processor, causes the processor to perform processes. The processes can include receiving a call from a communication device. In addition, the processes can include connecting with a provider within the list of providers. The processes can also include directing the call from the communication device to the provider when authorized by the provider.

In one embodiment, the processes can include receiving search criteria from the communication device to identify the provider within the list of providers. In one embodiment, the search criteria can be received through speech recognition software on the communication device. In one embodiment, the search criteria can be received through a softkey on the communication device. In one embodiment, connecting with the provider can include using an automated voice system for receiving the authorization from the provider. In one embodiment, the processes can include connecting with a second provider within the list of providers and directing direct the call from the communication device to the second provider when authorized by the second provider.

In one embodiment, the processes can include removing the provider from the list of providers when directed by the provider. In one embodiment, the processes can include removing the provider from the list of providers when the provider fails to connect with the phone system a predetermined number of times. In one embodiment, the list of providers within the data repository can be updated through a website connected to the phone system. In one embodiment, the provider can be associated with a location near the communication device.

In accordance with another aspect of the present application, a computer-implemented method for dynamically managing directory services is provided. The method can include contacting a provider within the directory services. In addition, the method can include determining whether to delist the provider. The method can also include removing the provider from the directory services based on the determination.

In one embodiment, when determining whether to delist the provider, the computer-implemented method can include using an interactive voice response system. In one embodiment, when determining whether to delist the provider, the computer-implemented method can include receiving a request from the provider. In one embodiment, when determining whether to delist the provider, the computer-implemented method can include identifying a number of times the provider was contacted. In one embodiment, removing the provider from the directory services can include delisting the provider for a specified time. In one embodiment, the provider can be an employee within an organization. In one embodiment, the provider can be a vendor.

In accordance with yet another aspect of the present application, a system is provided. The system can include a phone having a positioning system and an input device, the positioning system determining a location of the phone and the input device receiving search criteria. The phone can provide the location and the search criteria to a communication service provider, the communication service provider identifying a set of relevant businesses around or at the location using the search criteria, the communication service provider verifying whether a business within the set of relevant businesses accepts calls and if not, the communication service provider removes the business from the set of relevant businesses.

In one embodiment, the set of relevant businesses can be provided to the phone. In one embodiment, the set of relevant businesses can be connected with the phone through the communication service provider.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A phone system comprising:
a data repository storing a list of providers;
at least one processor; and
a memory operatively coupled to said processor, said memory storing program instructions that when executed by said processor, causes said processor to:
receive a search criteria from a communication device;
search for providers in the data repository which match the criteria;
provide a set of plural relevant providers resulting from the search to said communication device;
receive a selection of a provider from the set;
direct a call from said communication device to said provider when authorized by said provider; and
remove said provider from said list of providers for a specified time when said provider fails to connect with said phone system a predetermined number of times.

2. The phone system of claim 1, wherein said search criteria is received through speech recognition software on said communication device.

3. The phone system of claim 1, wherein said search criteria is received through a softkey on said communication device.

4. The phone system of claim 1, wherein connecting with said provider comprises using an automated voice system for receiving said authorization from said provider.

5. The phone system of claim 1, wherein said memory storing program instructions, when executed by said processor, further causes said processor to:
connect with a second provider within said list of providers; and
direct a call from said communication device to said second provider when authorized by said second provider.

6. The phone system of claim 1, wherein said memory storing program instructions, when executed by said processor, causes said processor to remove said provider from said list of providers when directed by said provider.

7. The phone system of claim 1, wherein said list of providers within said data repository is updated through a website connected to said phone system.

8. The phone system of claim 1, wherein said provider is associated with a location near said communication device.

9. In a communication system, a computer-implemented method for dynamically managing directory services comprising:
computer-implemented programming for:
contacting a provider within said directory services;
determining whether to delist said provider as a result of said contacting; and
removing said provider from said directory services based on said determination and delisting said provider for a specified time,
wherein determining whether to delist said provider comprises identifying a number of times said provider was contacted.

10. The computer-implemented method of claim 9, wherein determining whether to delist said provider comprises using an interactive voice response system.

11. The computer-implemented method of claim 9, wherein determining whether to delist said provider comprises receiving a request from said provider.

12. The computer-implemented method of claim 9, wherein said provider is one of either an employee within an organization or a vendor.

13. The phone system of claim 1, wherein said list of providers comprises vendors or employees.

14. A computer-implemented method for connecting a user with an entity in a phone system environment, the method comprising:
the phone system having computer-implemented programming for:
storing a list of entities in a data repository, the entities comprising vendors, providers or employees;
receiving a search criteria from a communication device;
finding entities in the data repository which match the search criteria;
providing a set of plural relevant entities to said communication device, wherein a relevant entity comprises a provider or employee which matches said search criteria;
receiving a selection of an entity from the set;
allowing a user to connect a call from said communication device to said selected entity when authorized by said entity; and
removing an entity from said list for a specified time when said entity fails to connect with said user a predetermined number of times.

15. The method of claim 14, comprising receiving said search criteria through speech recognition software on said communication device and/or through a softkey on said communication device.

16. The method of claim 14, comprising connecting with said entity using an automated voice system for receiving said authorization from said entity.

17. The method of claim 14, wherein said entity is associated with a location near said communication device.

* * * * *